United States Patent [19]

Reum

[11] Patent Number: 5,081,670
[45] Date of Patent: Jan. 14, 1992

[54] SMART DATA STATION TERMINATION (DST) WITHOUT ACTIVE EQUALIZERS

[75] Inventor: Peter M. Reum, Littleton, Colo.

[73] Assignee: XEL Communications, Inc., Aurora, Colo.

[21] Appl. No.: 679,232

[22] Filed: Apr. 2, 1991

[51] Int. Cl.[5] ............................................. H04M 1/24
[52] U.S. Cl. ......................................... 379/28; 379/5; 379/29; 375/10
[58] Field of Search ............... 379/28, 29, 30, 5, 6; 375/10

[56] References Cited

U.S. PATENT DOCUMENTS

5,018,184 5/1991 Abrams et al. ..................... 379/29

Primary Examiner—Stafford D. Schreyer
Attorney, Agent, or Firm—Dorr, Carson, Sloan & Peterson

[57] ABSTRACT

A smart data station termination ("DST") uses a method for remote alignment in which the switched access remote test system ("SARTS") sends a test tone of a single, predetermined frequency and power level to the receive-in port of the DST. The DST amplifies this test tone by a fixed gain factor (e.g. 4 dB) and then progressively increases attenuation (e.g. by 0.1 dB increments) of said amplified test tone until the resulting signal supplied to the receive-out port of the DST is reduced to a predetermined power level (i.e. −16 dBm). After alignment, the attenuation factor remains constant during normal operation of the DST. The preferred embodiment also provides a transponder mode of operation in which test signals received from the SARTS through the receive-in port of the DST are routed through an automatic gain control ("AGC") amplifier and transmitted back to the SARTS at a substantially constant level through the transmit-out port of the DST. A loopback mode is also be provided in which the AGC amplifier is bypassed.

22 Claims, 11 Drawing Sheets

COMMAND MODE

Fig. 6

REMOTE ALIGNMENT MODE

Fig. 7
REMOTE ALIGNMENT MODE

Fig. 8

TRANSPONDER MODE

Fig. 9

TRANSPONDER MODE

Fig. 10 LOOPBACK MODE

*Fig. 11*

LOOPBACK MODE

SMART DATA STATION TERMINATION (DST) WITHOUT ACTIVE EQUALIZERS

BACKGROUND OF THE INVENTION

1. Field of the Invention

The present invention relates generally to the field of telephony. More particularly, the present invention involves a simplified, smart data station termination ("DST") adapted for automatic alignment without the need for active equalizers.

2. Statement of the Problem

Figure 2:
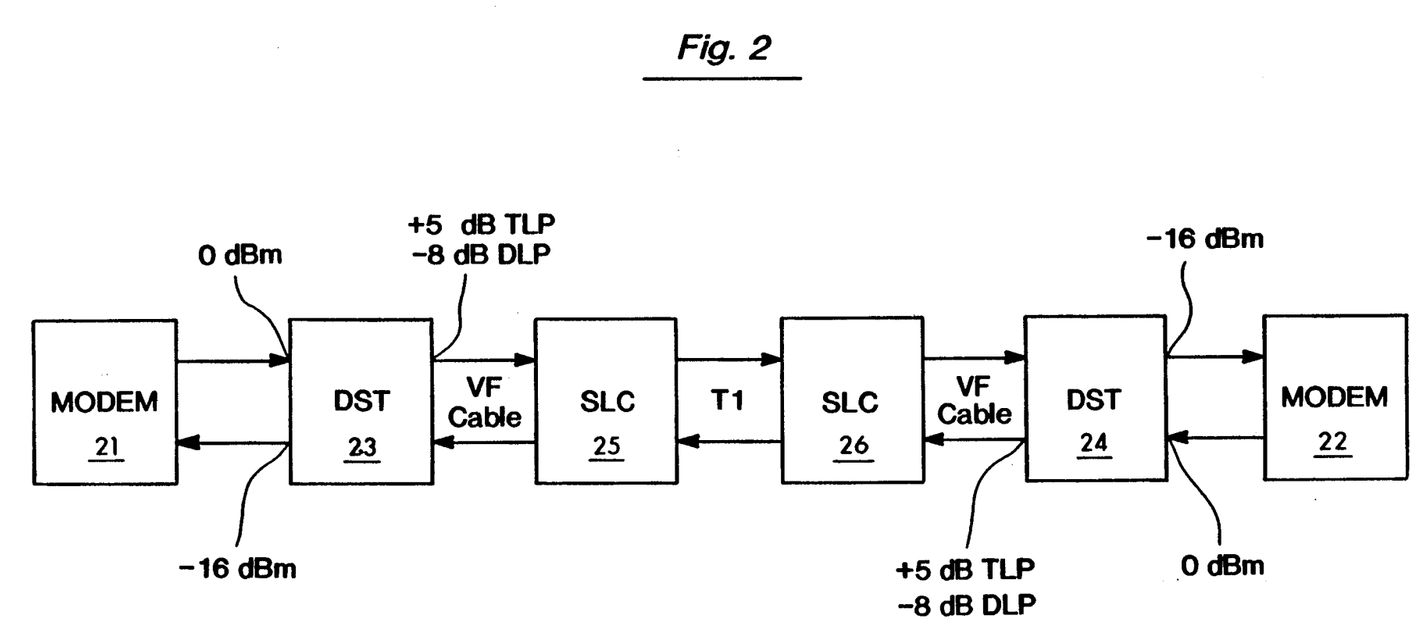
FIG. 2 is a block diagram showing a typical application for a DST.

Data station termination ("DST") units are widely used to provide an interface between a conventional 4-wire telephone communications system and a conventional 4-wire data modem. For example, FIG. 2 shows communications between two data modems 21 and 22 over a typical telephone communications system. Both of the modems 21 and 22 have a DST 23 and 24, respectively, providing an interface with the local subscriber loop carrier ("SLC") 25 and 26. Each DST has the following ports: (1) receive-in; (2) receive-out; (3) transmit-in; and (4) transmit-out. The output signal from each modem 21 and 22 is at the 0 dBm level at the transmit-in port for each DST 23 and 24, as shown in FIG. 2. By convention, the DST produces a corresponding output signal at its transmit-out port at either +5 dB or −8 dB depending whether the DST is set for TLP (transmission level point) operation or DLP (data level point) operation. The signal is carried by voice-frequency cables to its SLC. Communications between the SLC's 25 and 26 typically occur over a T1 telephone line in digital format. By convention, the receive-in port of the DST accepts signal levels ranging from approximately 8 to −23 dBm DLP, or +5 to −10 dBm TLP. After installation, the receive channel of the DST should be aligned so that the signal level at the receive-out port is approximately −16 dBm.

Alignment of the DST receive channel is conventionally accomplished by using a switched access remote test system ("SARTS") located at the telephone central office to send a series of test tones at different frequencies to the receive-in port of the DST. A corresponding series of active equalizers are commonly used in the DST to provide the necessary gain at each of the test frequencies. These adjustments can either be done manually, or automatically if an intelligent DST is used. However, active equalizers add substantial complexity and expense to the DST, and also greatly complicate the alignment procedure.

A number of devices have been invented in the past incorporating smart DST technology. The IN-TELIPORT Data Station Termination, Model SDS9486, by Teltrend, Inc., 620 Stetson Avenue, St. Charles, Ill. 60174 is described in Teltrend Technical Publications 57-71-9486, Rev. B (February 1986). This device is an intelligent DST with an on-board microcomputer and precision oscillator which controls and generates test tones (1004 Hz, 2804 Hz, and 404 Hz) for alignment purposes, measures and calculates the amount of receive gain and equalization required at each frequency, and then automatically adjusts and verifies the adjustments for proper alignment. The unit also provides a loopback mode of operation.

The 4420GD RA Series 4Wire-to-4Wire Data Station Termination by Tellabs, Inc., 4951 Indiana Avenue, Lisle, Ill. 60532-1698 is described in Tellabs Technical Manual 76-814420GD (May 1987). This Tellabs unit is another example of an intelligent DST with an automatic alignment feature. Alignment takes place through a dialogue of tones at various frequencies sent from the central office ("CO") and returned by the DST. So that CO personnel can easily distinguish between tones sent to and tones returned by the DST, those tones returned by the DST are deliberately higher than the nominal CO test tone frequencies. Specifically, the DST returns tones of 1014, 2814, 414, and 1820 Hz in response to CO tones of 1004, 2804, 404, and 1804 Hz, respectively. This DST is capable of aligning only its receive-channel, or both its receive-channel and transmit-channel levels and equalizations. Again, equalization at each test frequency is provided.

3. Solution to the Problem

None of the prior art references show an intelligent DST that eliminates the need for active equalizers by using a single test tone from the SARTS for remote alignment of the DST.

SUMMARY OF THE INVENTION

This invention provides a smart data station termination ("DST") using a method of remote alignment in which the switched access remote test system ("SARTS") sends a test tone of a single, predetermined frequency and power level to the receive-in port of the DST. The DST amplifies this test tone by a fixed gain factor (e.g. 4 dB) and then progressively increases attenuation (e.g. by 0.1 dB increments) of said amplified test tone until the power level of the resulting signal supplied to the receive-out port of the DST is reduced to a predetermined level (i.e. −16 dBm). After alignment, this attenuation factor remains constant during normal operation of the DST. The preferred embodiment also provides a transponder mode of operation in which test signals received from the SARTS through the receive-in port of the DST are routed through an automatic gain control ("AGC") amplifier and transmitted back to the SARTS at a substantially constant level through the transmit-out port of the DST. A loopback mode can also be provided in which the AGC amplifier is by-passed.

A primary object of the present invention is to provide an intelligent DST that is substantially less expensive to produce than existing intelligent DST's.

Another object of the present invention is to provide an intelligent DST that is substantially simpler and hence more reliable than existing intelligent DST's.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
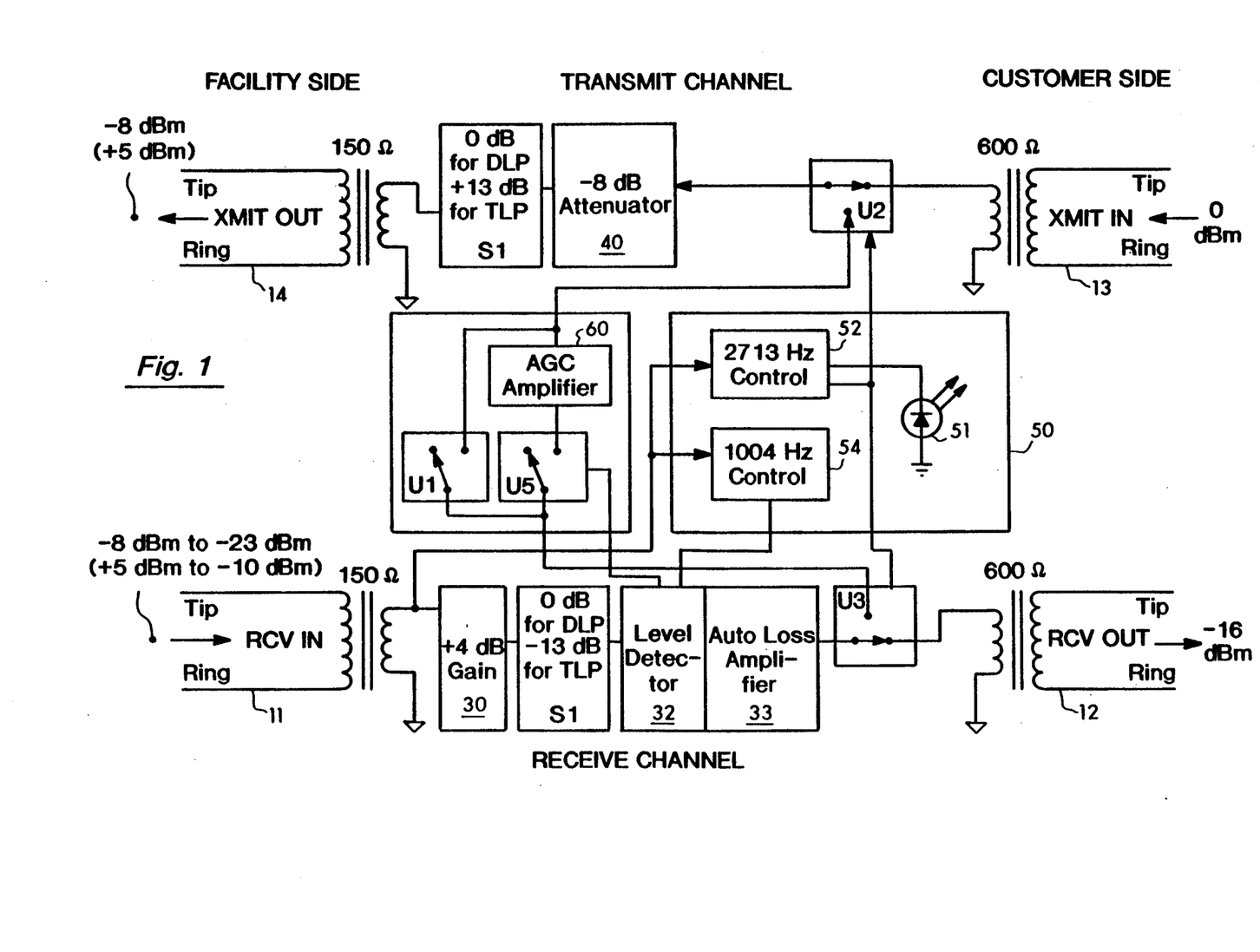
FIG. 1 is a simplified schematic diagram of a DST embodying the present invention.
Figure 3:
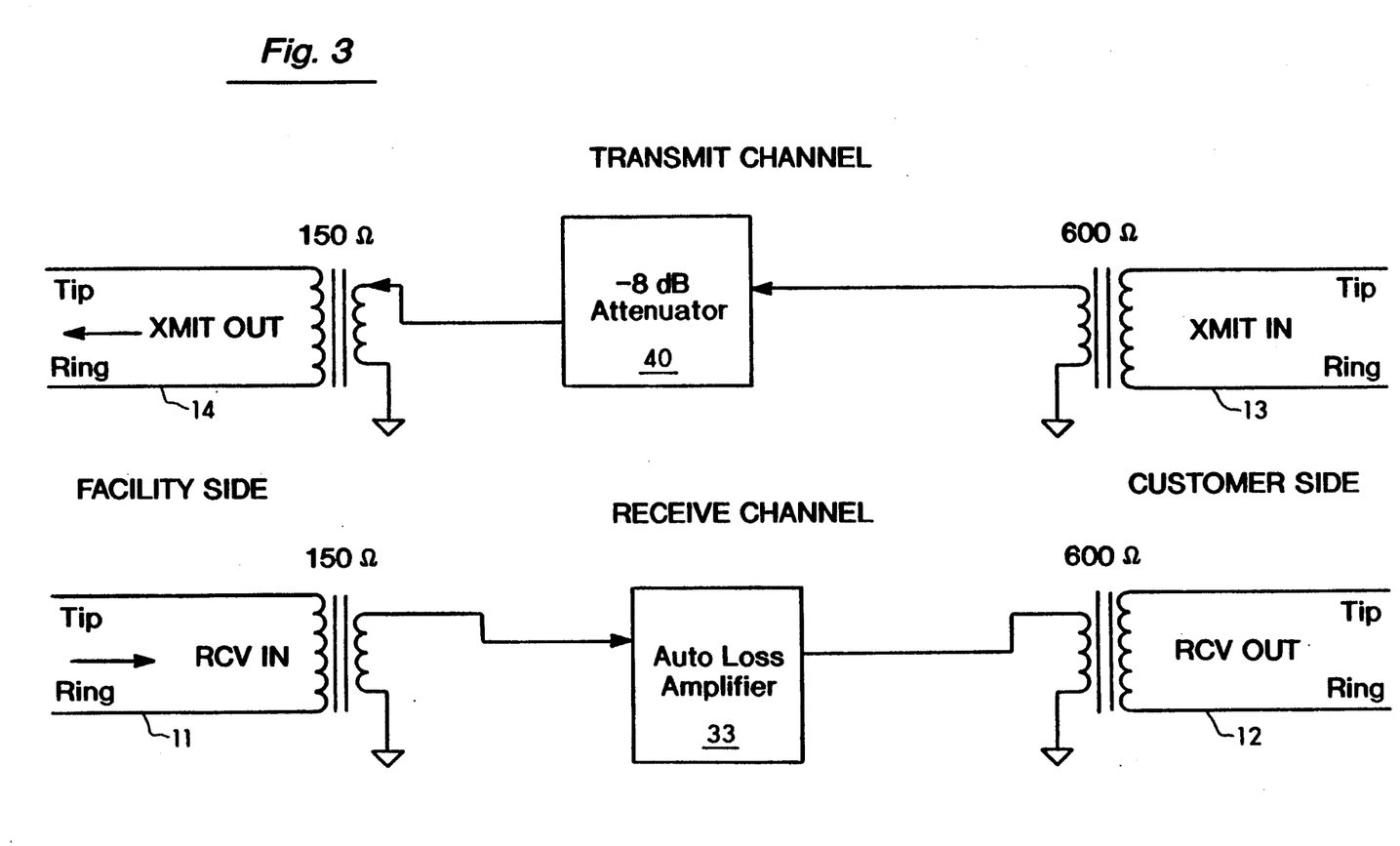
FIG. 3 is a simplified schematic diagram showing the normal operational mode of a DST.
Figure 4:
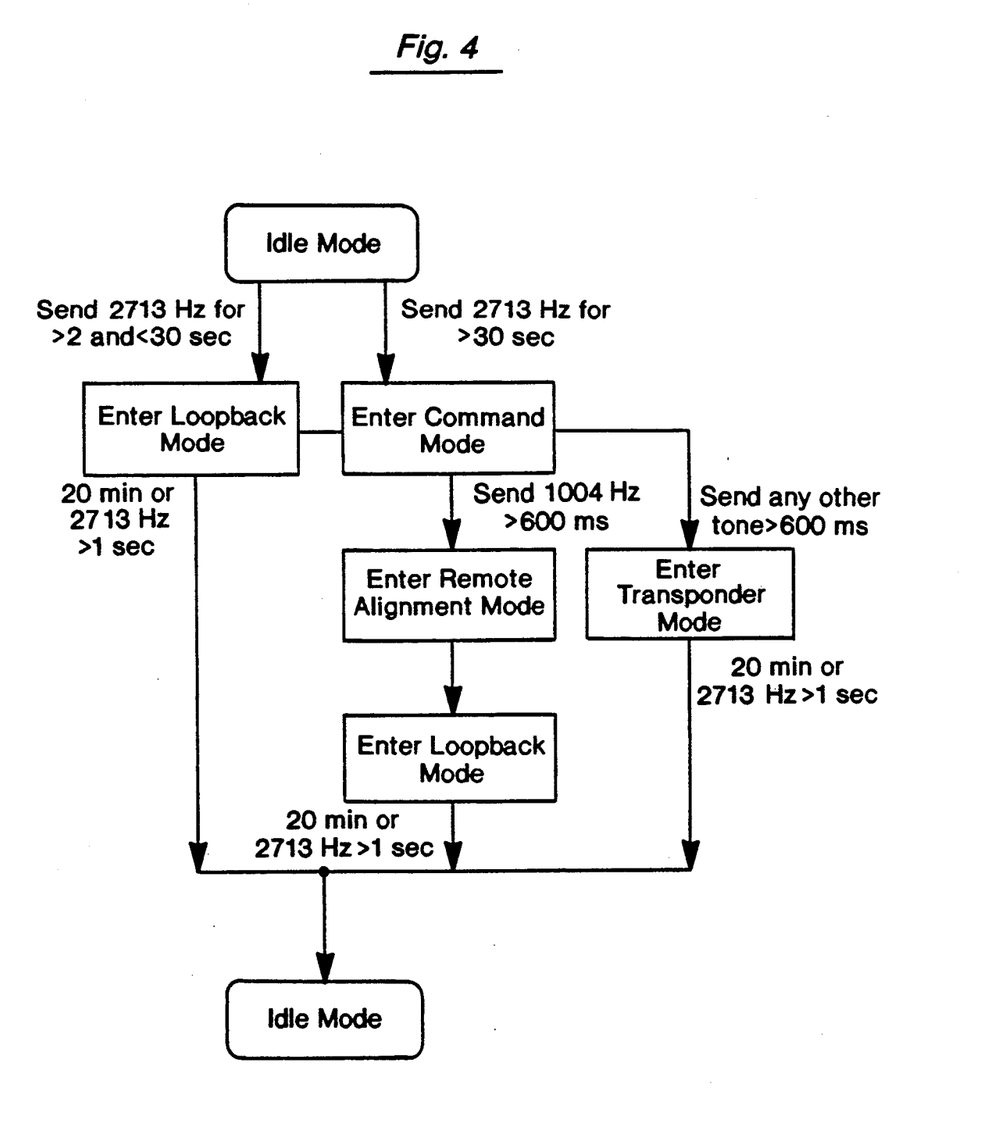
FIG. 4 is a flow chart showing the command mode of the present invention.

FIG. 1 provides an overall block diagram of the present invention, and FIG. 4 is a corresponding flow chart describing its overall operation. However, the present invention may be more readily understood by focusing on the various modes of operation of the DST as outlined in FIG. 4:

Operational Mode. FIGS. 2 and 3 are simplified block diagrams of the DST in its normal operational (or idle) mode. The transmit channel of the DST 23 accepts data in the form of an analog signal from the modem 21 through the transmit-in port 13 and transmits this signal through the transmit-out port 14 of the DST to the central office or SLC 25. Either DLP (data level point) or TLP (transmission level point) operation can be selected by manually setting a switch S1 on the DST. Both DST's 23 and 24 should be set for the same mode for satisfactory operation. By convention, the signal from the transmit-in port 13 is first attenuated by −8 dB and then amplified by +13 dB if switch S1 has been set for TLP operation. This results in a signal level at the transmit-out port of −8 dBm for DLP, or +5 dBm for TLP.

The receive channel of the DST 23 receives data in the form of an analog signal at its receive-in port 11 from the telephone central office or SLC 25 and delivers this signal to the customer telephone equipment (i.e. a modem 21) connected to the receive-out port 12. The signal level supplied by the SLC 25 or 26 at the receive-in port 11 of the DST is typically about −8 dBm to −23 dBm for DLP operation, or approximately +5 dBm to −10 dBm for TLP operation. By convention, the signal level at the receive-out port 12 of the DST 23 should be approximately −16 dBm. Therefore, the DST must apply an appropriate amplification factor or attenuation factor to the receive-in port 11 signal to provide a proper signal level at the receive-out port 12. This process of selecting the appropriate amplification-/attenuation factor is typically determined during an initial alignment process (discussed below) following installation of the DST, and which then remains fixed during subsequent operation of the DST.

The signal processing of the receive channel in the present invention is shown in greater detail in FIG. 1. The signal received at the receive-in port 11 of the DST is first amplified by a fixed gain amplifier 30 (e.g. +4 dB). A fixed attenuation of −13 dB is then applied if the manual switch S1 is set for TLP operation. Finally, additional attenuation (determined during alignment) is applied by the auto loss amplifier 33 to produce an output signal level at the receive-out port 12 of approximately −16 dBm.

Figure 5:
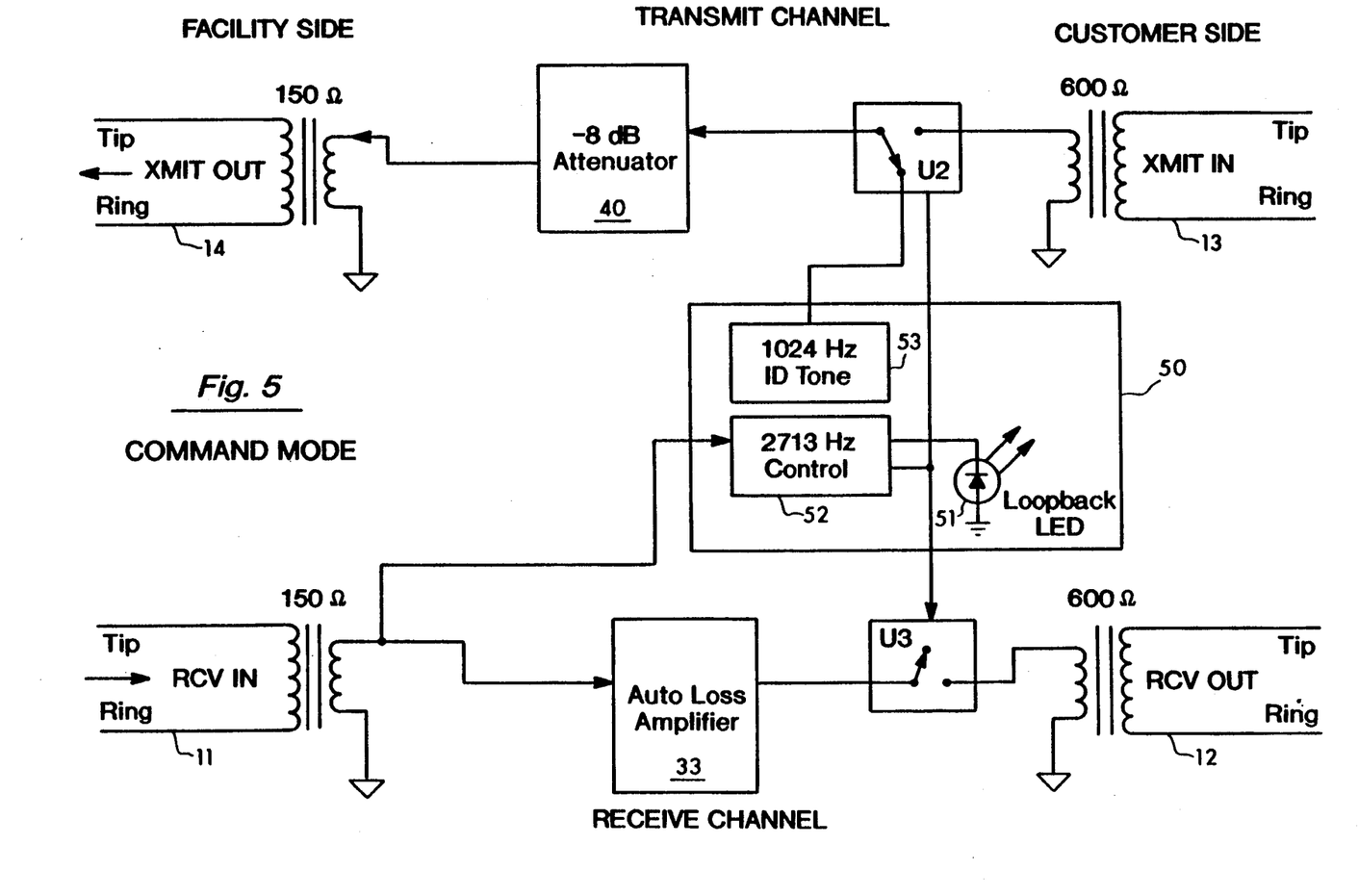
FIG. 5 is a simplified schematic diagram showing operation of the present invention in command mode.
Figure 6:
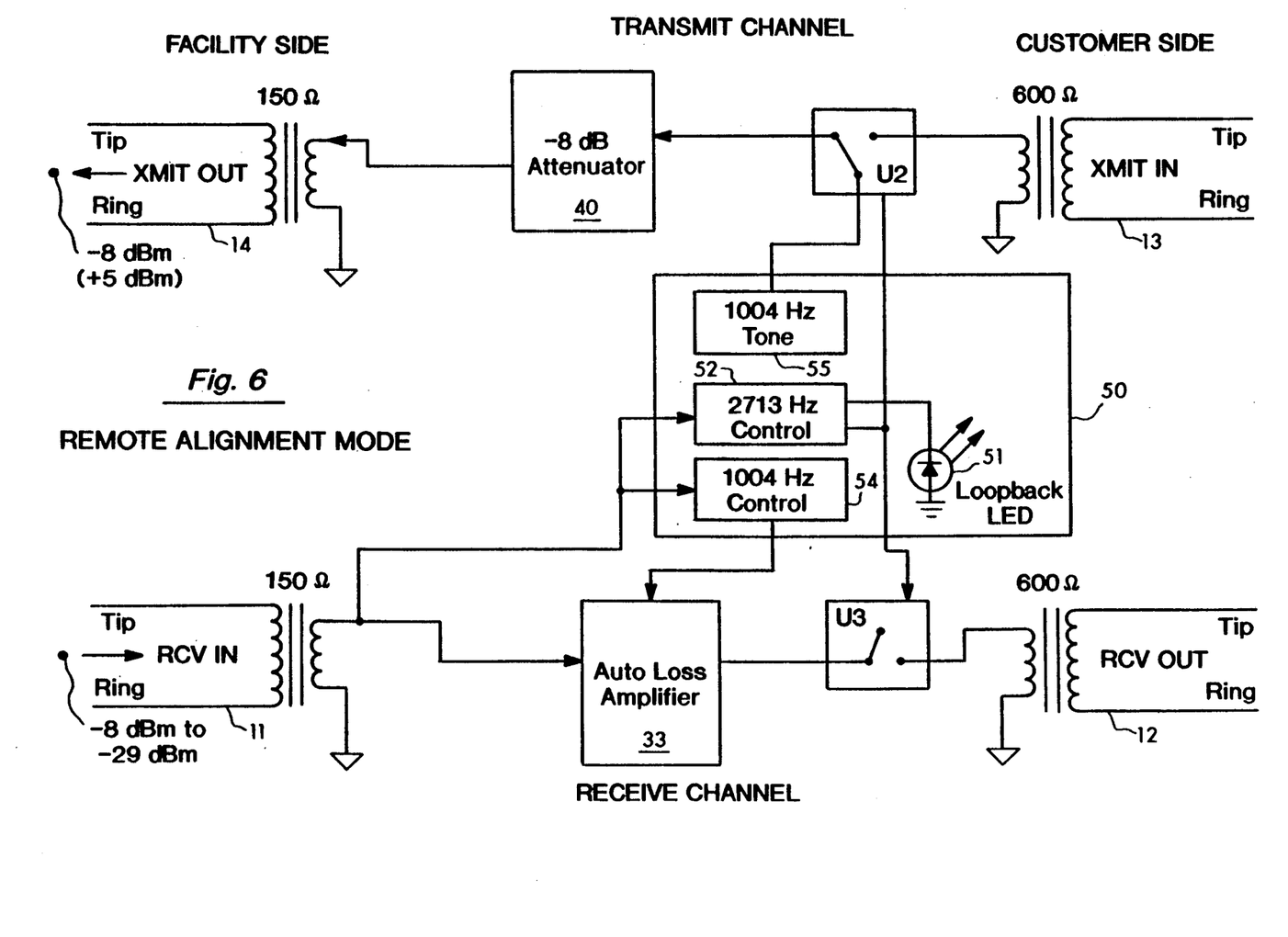
FIG. 6 is a simplified schematic diagram showing operation of the present invention in remote alignment mode.
Figure 7:
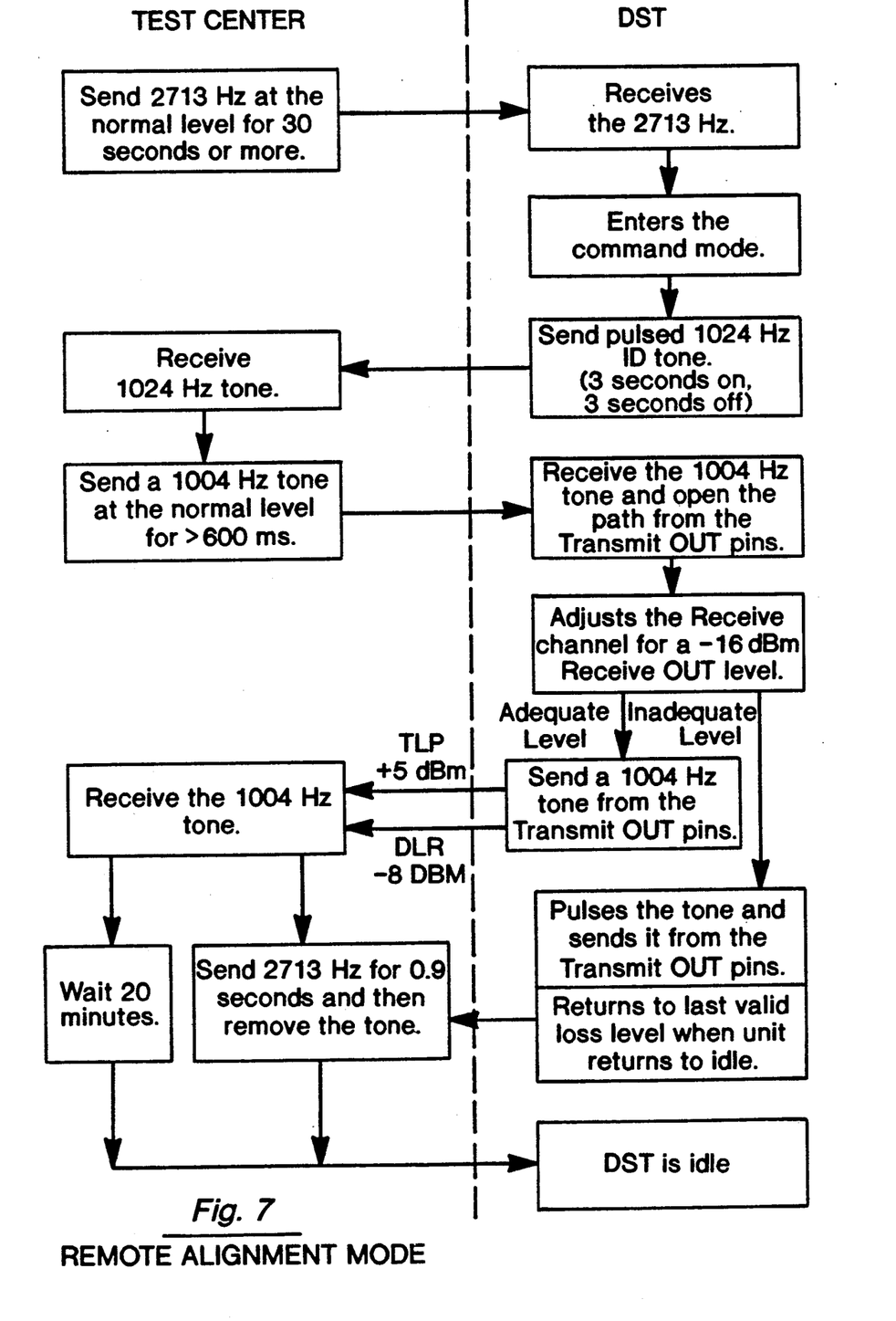
FIG. 7 is a flow chart showing the remote alignment mode of the present invention.

Command Mode. FIG. 5 provides a simplified block diagram of the DST in command mode. This mode is entered when the SARTS sends a 2713 Hz tone for 30 seconds or more to the receive-in port of the DST. This tone is detected by a 2713 Hz control 52, and the DST responds with a pulsed 1024 Hz identification tone 53 (three seconds on, three seconds off) from the transmit-out port. The identification tone confirms to the SARTS that the DST is intelligent and that the DST has entered command mode. In command mode, U2 and U3 open the transmission paths to the customer telephone equipment and the loopback LED 51 lights. As shown in FIG. 4, if the SARTS then sends a 1004 Hz tone for longer than 600 msec., the DST enters remote alignment mode. If the SARTS sends any other tone for longer than 600 msec., the DST enters transponder mode.

Remote Alignment Mode. As shown in FIG. 4, the DST enters remote alignment mode if the SARTS sends a 1004 Hz tone to the receive-in port 11 for 30 seconds or more while the DST is in command mode. U2 and U3 open the transmission paths to the customer telephone equipment. The auto loss amplifier 33 uses the 1004 Hz tone from the SARTS to incrementally adjust the signal level at the receive-out port 12 to approximately −16 dBm. This level then remains fixed after the DST returns to its normal operational mode. More specifically, as shown in FIG. 1, the 1004 Hz signal received at the receive-in port 11 of the DST is first amplified by a fixed gain amplifier 30 (e.g. +4 dB). If switch S1 has been set for TLP operation, the signal is then attenuated by −13 dB. Finally, the resulting signal is processed by the auto loss amplifier 33 which further attenuates the signal to produce an output signal level of approximately −16 dBm. The attenuation of the auto loss amplifier 33 is adjustably controlled by a level detector 32 which progressively increases the attenuation of the auto loss amplifier 33 in predetermined increments (e.g. 0.1 dB) until the desired output signal level (−16 dBm) is achieved.

In the preferred embodiment of the present invention, the auto loss amplifier 33 acts only to attenuate, rather than amplify the 1004 Hz test tone. Any necessary amplification is provided by the fixed gain amplifier 30. In addition, it should be noted that no equalization is provided in the frequency domain. Once a gain/attenuation factor is determined during alignment, that factor is used to effectively shift the entire frequency response curve of the DST during subsequent normal operation of the DST.

Once alignment is completed, a 1004 Hz tone 55 is routed back through the transmit-out port 14 to the SARTS as confirmation that alignment has been successfully completed. Normal operation is restored after 20 minutes, or when a 2713 Hz tone lasting approximately one second or longer is received at the receive-in port 11 of the DST. If an error occurs during alignment (usually caused by a low input level), the DST sends a pulsed tone back to the SARTS to indicate the error condition, and restores the last known good setting for the auto loss amplifier 33 from memory before returning to operational mode.

Figure 8:
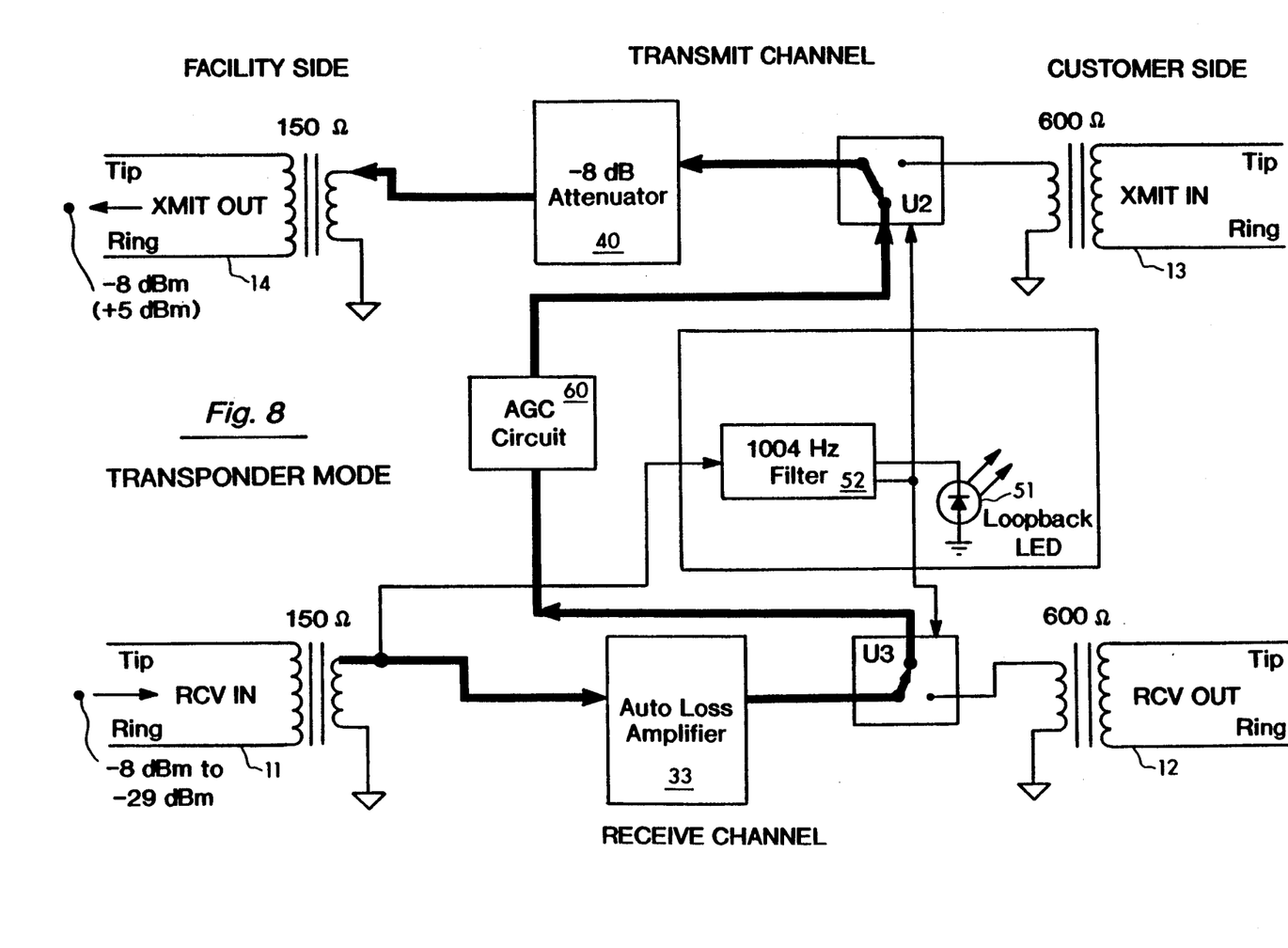
FIG. 8 is a simplified schematic diagram showing operation of the present invention in transponder mode.
Figure 9:
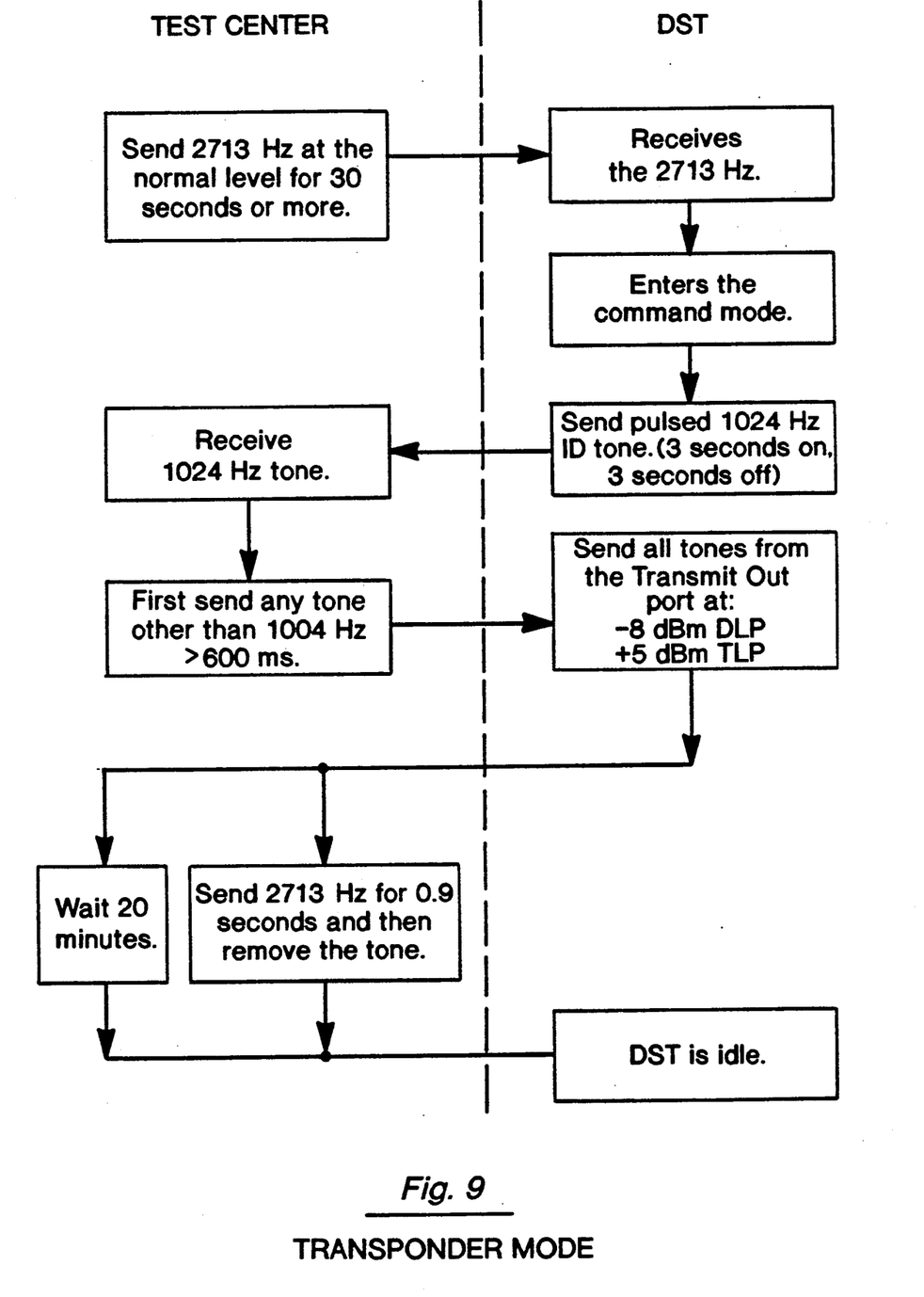
FIG. 9 is a flow chart showing the transponder mode of the present invention.

Transponder Mode. FIGS. 8 and 9 show a simplified block diagram and corresponding flowchart for the DST in transponder mode. If the SARTS sends any tone other than 1004 Hz while in the command mode, the DST enters the transponder mode. U2 and U3 open the transmission paths to the customer telephone equipment. In transponder mode, all test signals sent by the SARTS to the receive-in port 11 of the DST are sent through an auto gain control ("AGC") amplifier 60 and returned by the transmit-out port 14. The AGC amplifier 60 provides an output signal at a substantially constant level regardless of frequency. The setting of switch S1 determines the level of the return tone at the transmit-out port, i.e., approximately −8 dBm when set to DLP or +5 dBm when set to TLP. By convention, test tones of approximately 404 Hz, 1004 Hz, 1804 Hz, and 2804 Hz are sent by the SARTS and echoed by the DST. The DST remains in transponder mode either for a predetermined period of time (e.g. 20 minutes), or until the SARTS sends a 2713 Hz tone for one second or longer to terminate transponder mode.

Figure 10:
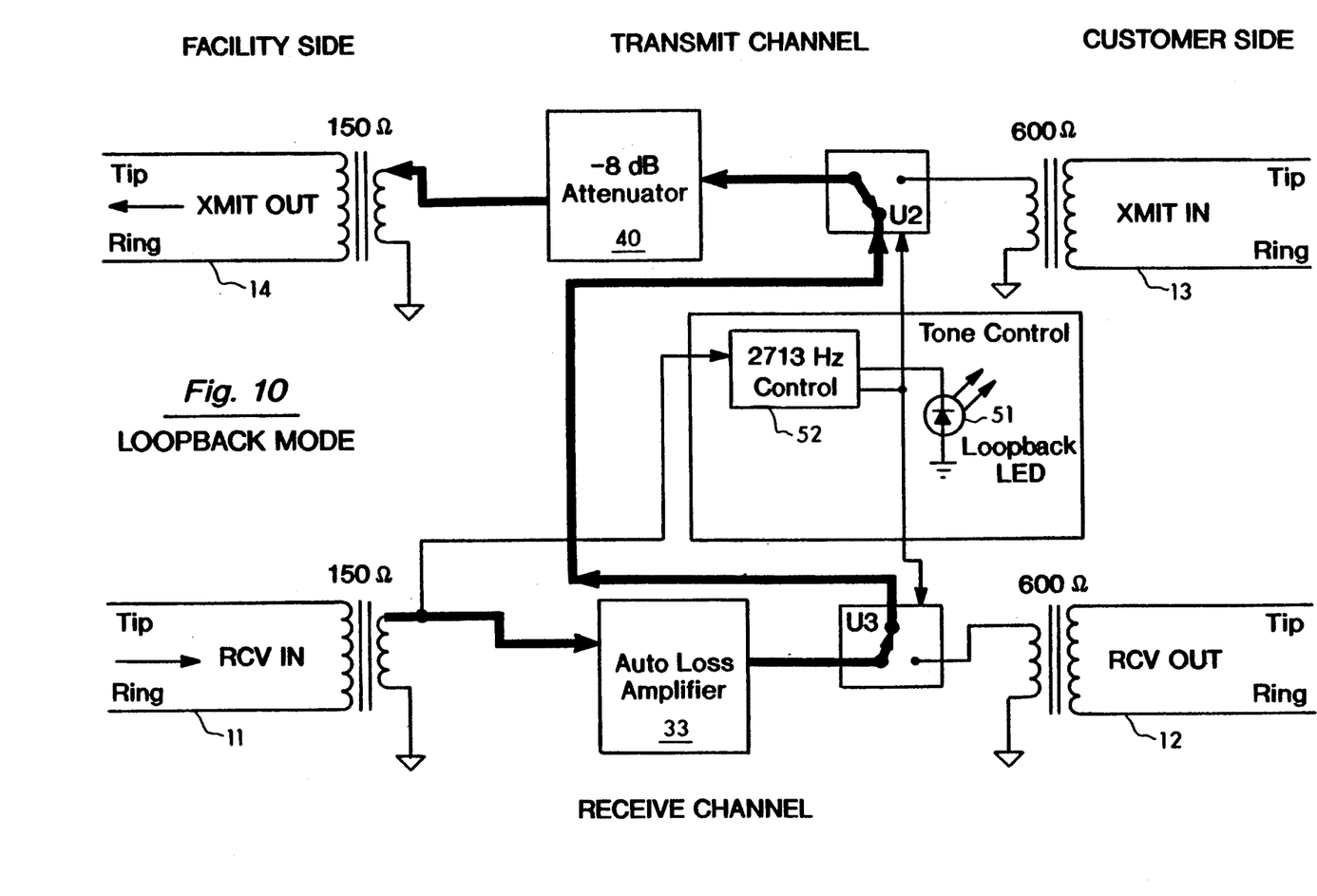
FIG. 10 is a simplified schematic diagram showing operation of the present invention in loopback mode.
Figure 11:
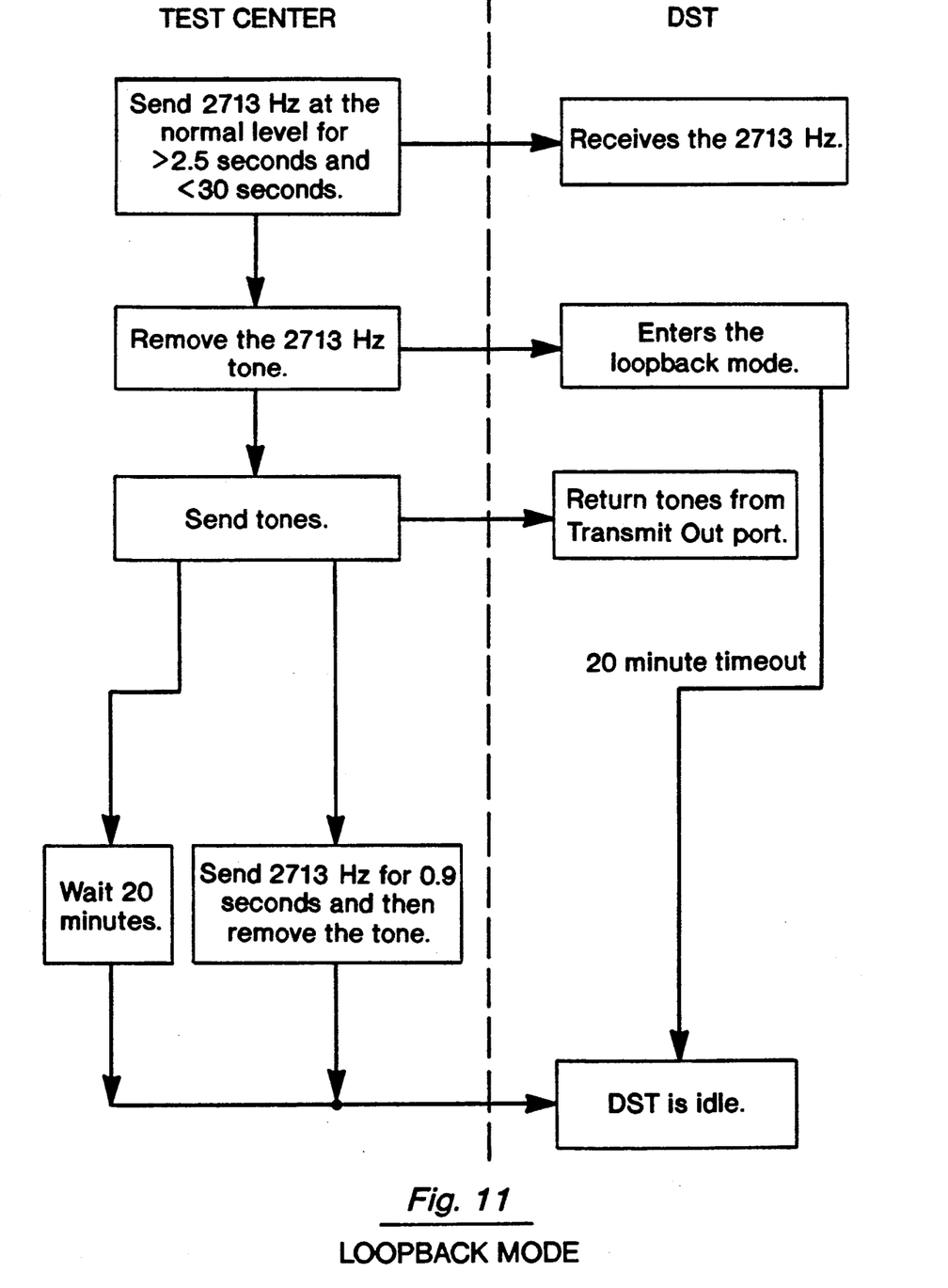
FIG. 11 is a flow chart showing the loopback mode of the present invention.

Loopback Mode. A simplified block diagram of the DST in loopback mode is provided in FIG. 10. A corresponding flowchart is provided in FIG. 11. Loopback mode is initiated when the SARTS sends a 2713 Hz tone for the receive-in port 11 of the DST for more than 2 seconds and less than 30 seconds. The DST replies with a 300 ms burst of 1024 Hz tone and then enters the loopback mode. The loopback LED 51 lights. U2 and U3 open the transmission path to the customer telephone equipment. Any test signals subsequently sent by the SARTS to the receive-in port 11 of the DST are routed through all of the active circuits in the receive channel and transmit channel, and then back to the SARTS through the transmit-out port 14. The level of the returned signal is effectively determined by the setting of the auto loss amplifier 33 which is set during the remote alignment mode. The primary difference between the transponder mode and loopback mode is that there is no AGC amplifier 60 in loopback mode (i.e. in loopback mode, U1 bypasses the AGC amplifier 60 as shown in FIG. 1). Loopback mode therefore allows the installer to vary the frequency of the test signal sent by the SARTS to test the line for flatness. If the DST has already been properly aligned, a test tone sent by the SARTS to the receive-in port will produce a corresponding return tone at the transmit-out port at approximately −8 dBm DLP or approximately +5 dBm TLP. The DST remains in loopback mode either for a predetermined period of time (e.g. 20 minutes), or until the SARTS sends a 2713 Hz tone for one second or longer to terminate loopback mode.

The above disclosure sets forth a number of embodiments of the present invention. Other arrangements or embodiments, not precisely set forth, could be practiced under the teachings of the present invention and as set forth in the following claims.

I claim:

1. In a data station termination (DST) having a receive-in port and a transmit-out port connected to a switched access remote test system (SARTS) and a receive-out port and a transmit-in port connected to customer telephone equipment, a method for remote alignment of said DST in response to commands from said SARTS comprising the following sequence of steps:
    (a) the SARTS transmits a predetermined alignment initiation signal to the receive-in port of said DST to initiate alignment;
    (b) the SARTS sends a test tone of a single, predetermined frequency and power level to the receive-in port of said DST; and
    (c) the DST amplifies said test tone received from said SARTS by a gain/attenuation factor determined such that the resulting signal to be delivered to said receive-out port has a predetermined power level.

2. The method of claim 1 wherein said gain/attenuation factor is determined by the DST by means of the following sequence of steps:
    (a) the DST amplifies said test tone received from said SARTS by a fixed gain factor; and
    (b) the DST progressively attenuates said amplified test tone until the resulting signal to be delivered to said receive-out port is reduced to a predetermined power level.

3. The method of claim 1 further comprising an additional step after step (a) wherein said DST transmits an acknowledgement signal from said transmit-out port to said SARTS after receipt of said alignment initiation signal.

4. The method of claim 1 further comprising an additional step wherein said DST transmits a completion signal from said transmit-out port to said SARTS after successful completion of step (c).

5. The method of claim 1 further comprising an additional step wherein said DST transmits an error signal from said transmit-out port to said SARTS in the event step (c) is not successful completed.

6. The method of claim 1 wherein said DST returns to its operational parameters preexisting said alignment initiation signal in the event step (c) is not successfully completed.

7. The method of claim 1 further comprising the following additional steps:
    (a) the DST disconnects said customer telephone equipment following receipt of said alignment initiation signal; and
    (b) the DST reconnects said customer telephone equipment following completion of said alignment method.

8. In a data station termination (DST) having a receive-in port and a transmit-out port connected to a switched access remote test system (SARTS) and a receive-out port and a transmit-in port connected to customer telephone equipment, a method for remote alignment of said DST in response to commands from said SARTS comprising the following sequence of steps:
    (a) the SARTS transmits a predetermined alignment initiation signal to the receive-in port of said DST to initiate alignment;
    (b) the SARTS sends a test tone of a single, predetermined frequency and power level to the receive-in port of said DST;
    (c) the DST amplifies said test tone received from said SARTS by a fixed gain factor; and
    (d) the DST progressively attenuates said amplified test tone until the resulting signal to be delivered to said receive-out port is reduced to a predetermined power level.

9. The method of claim 8 wherein said fixed gain factor is approximately +4 dB.

10. The method of claim 8 wherein the DST progressively increases attenuation of said amplified test tone in step (d) until the power level of the resulting signal is approximately −16 dBm.

11. The method of claim 8 wherein the DST progressively attenuates said amplified test tone in step (d) by decrements of 0.1 dB.

12. The method of claim 8 further comprising an additional step after step (a) wherein said DST transmits an acknowledgement signal from said transmit-out port to said SARTS after receipt of said alignment initiation signal.

13. The method of claim 8 further comprising an additional step wherein said DST transmits a completion signal from transmit-out port to said SARTS after successful completion of step (d).

14. The method of claim 8 further comprising an additional step wherein said DST transmits an error signal from said transmit-out port to said SARTS in the event step (d) is not successful completed.

15. The method of claim 8 wherein said DST returns to its operational parameters preexisting said alignment initiation signal in the event step (d) is not successfully completed.

16. The method of claim 8 further comprising the following additional steps:
    (a) the DST disconnects said customer telephone equipment following receipt of said alignment initiation signal; and
    (b) the DST reconnects said customer telephone equipment following completion of said alignment method.

17. A data station termination (DST) comprising:
    (a) a receive-in port and a transmit-out port connected to a remote central telephone office having a switched access remote test system (SARTS);
    (b) a receive-out port and a transmit-in port connected to customer telephone equipment;
    (c) control means adapted to detect control signals sent by said SARTS to said receive-in port to trigger any of a plurality of different modes of operation of said DST, said modes of operation comprising a remote alignment mode, a transponder mode, and an operational mode:
    (d) an amplifier adapted to receive a signal sent by said central telephone office to said receive-in port during said remote alignment mode, said signal including a test tone having a single predetermined frequency and power level sent by said SARTS during said remote alignment mode; said amplifier being further adapted to amplify said signal by a fixed gain factor;
    (e) an attenuator adapted to receive said amplified signal and to produce an attenuated output signal to said receive-out port; the attenuating factor of said attenuator being adjustably determined during said remote alignment mode to produce a predetermined output power level, with said attenuating factor thereafter remaining fixed during said operational mode; and
    (f) an automatic gain control (AGC) amplifier adapted to receive the output signal of said attenuator and output a substantially constant amplitude signal to said transmit-out port of said DST during said transponder mode.

18. The DST of claim 17 wherein said fixed gain factor of said amplifier is approximately +4 dB.

19. The DST of claim 17 wherein said attenuator progressively increases attenuation of said amplified test tone during said remote alignment mode until the power level of said output signal is approximately −16 dBm.

20. The DST of claim 17 wherein said attenuator progressively attenuates said amplified test tone during said remote alignment mode by decrements of 0.1 dB.

21. The DST of claim 17 further comprising switch means adapted to disconnect said customer telephone equipment from said DST during said remote alignment mode.

22. The DST of claim 17 further comprising a loopback mode of operation triggered by one of said control signals sent by said SARTS to receive-in port of said DST in which said output signal of said attenuator is connected to said transmit-out port of said DST.

* * * * *